June 7, 1955
C. C. TILTON
2,710,098
FLOUR SIFTER ASSEMBLY
Filed Aug. 24, 1953
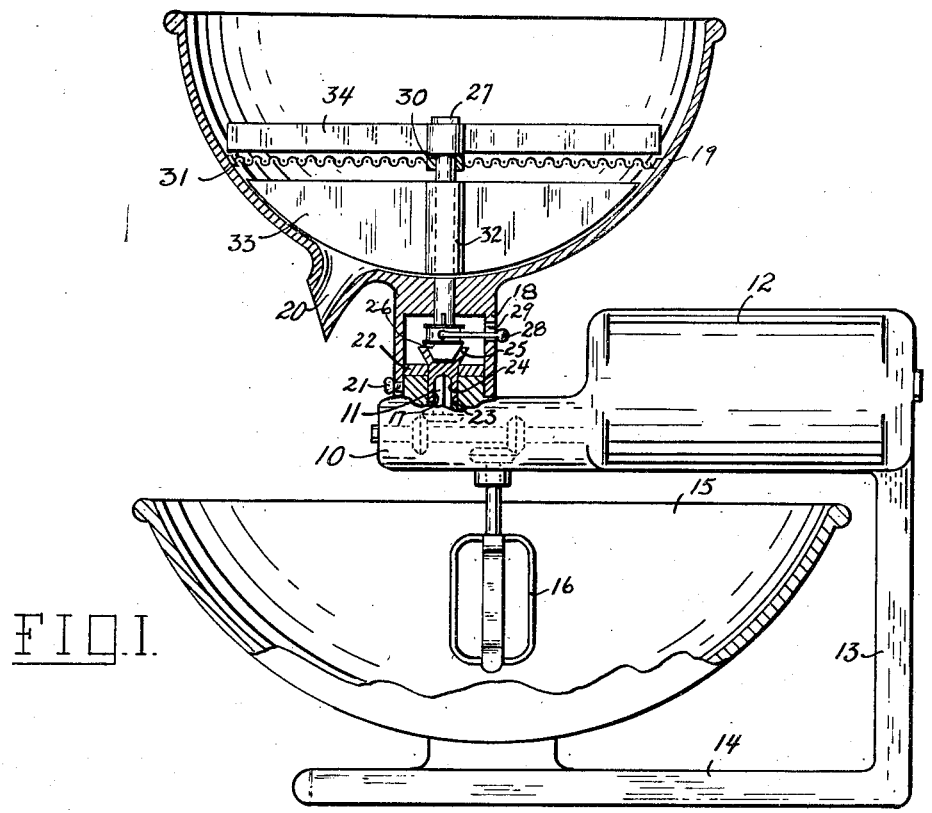
FIG.1.
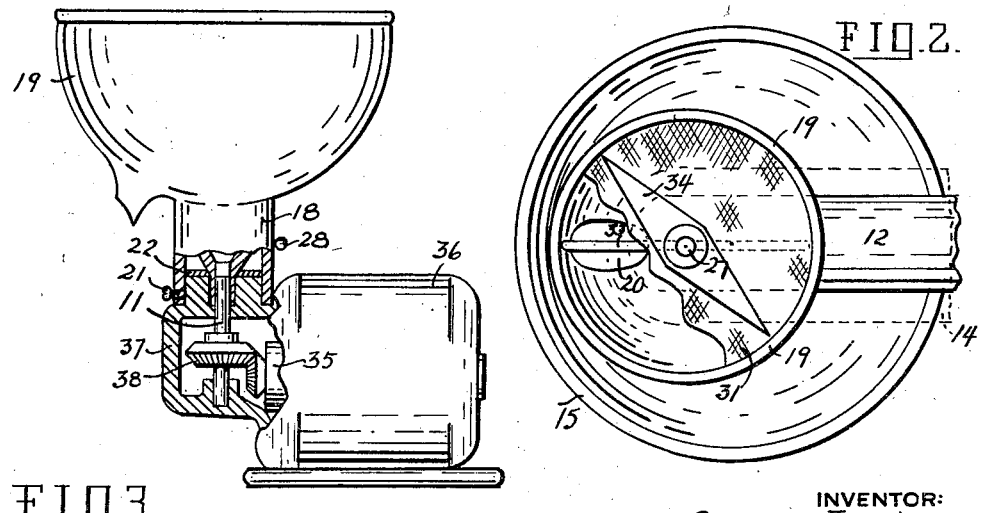
FIG.3.
FIG.2.
INVENTOR:
CATHERINE TILTON
BY Richardson, Davis and Vordon
ATTYS

United States Patent Office 2,710,098
Patented June 7, 1955

2,710,098

FLOUR SIFTER ASSEMBLY

Catherine Crawford Tilton, Brooklyn, N. Y.

Application August 24, 1953, Serial No. 375,929

1 Claim. (Cl. 209—358)

This invention relates to a sifter attachment for a kitchen appliance and has reference particularly to a power operated flour sifter and mixing device.

It is required when using flour for baking mixes, such as cake, bread, biscuits, etc., to thoroughly sift the flour and other dry ingredients, and in order to utilize the power units now available in practically all well equipped kitchens, the present invention is devised to be attached to any of the well known mixing machines for the purpose of being operated thereby for sifting and mixing baking flour and other dry ingredients.

It is the object of the present invention to provide a novel and practical flour sifter, which may be attachably connected to a power unit, and which consists of a hopper to receive the dry ingredients, a screen disposed within the hopper to divide same into upper and lower compartments, a rotary agitator operating over the screen in the upper compartment, a rotary distributor in the lower compartment to move the sifter ingredients toward and into a discharge spout, and clutch controlled rotary means for operating the agitator and distributor from an attachable connection with a power unit.

A further object of the invention is to provide a self-contained power-operated flour sifter of the character described in which the sifter, the power unit and connecting element are an integral part of a machine.

The objects of this invention are accomplished by means of the novel arrangement and combination of parts hereinafter described and claimed, and illustratively exemplified in the accompanying drawings, in which:

Fig. 1 is an elevational view of a power driven food mixer having a flour sifter and mixer according to the present invention attached thereto, the sifter being shown in substantialy longitudinal section;

Fig. 2 is a top plan view of the device; and

Fig. 3 is a substantially longitudinal sectional view of the self-contained power unit and flour sifter.

Referring to the drawings, and particularly to Figs. 1 and 2 thereof, 10 denotes a power-operated food mixer of any well known construction having an upright power take-off shaft 11 projecting from the motor housing 12. The housing 12 is supported on an upright standard 13 and base 14. Rotatably mounted on the base at the forward end thereof is a mixing bowl 15. Depending from the motor housing 12 and operated thereby is a rotary beater 16 suspended in the bowl 15. These are the usual elements of a food mixer of this type, which is illustrated more or less without regard to details.

The power take-off shaft 11 rotates in a boss 17 cast in the motor housing 12 and upon the boss is mounted the depending socket connection 18 of an upright sifter bowl 19, which is provided with a spout 20 disposed in the lower portion and radially of the bowl, so as to discharge its sifted contents into the lower mixing bowl 15. The socket connection 18 is provided with a setscrew 21 or other fastening means to engage the boss and hold the sifter against rotation. Secured in the socket connection 18 is a ring 22 having mounted rotatably therein a hub 23 consisting of a socket 24 to fit into the squared end of the shaft 11 to enable it to turn with the latter. The upper end of the clutch forms one portion of a cone clutch 25, the other driven member 26 being axially adjustable on an upright shaft 27 supported in the socket connection 18 and base of the upper bowl 19. Adjustment of member 26 by means of a slidable control rod 28 operating in a slot 29 in the wall of the socket 18 causes the cone clutch 25 to become engaged or disengaged by the operator.

The shaft 27 projects upwardly into the bowl 19 and through a bearing 30 in a lateral screen partition 31, which forms the sifting element disposed approximately midway the depth of the upper bowl 19. Between the bottom of the bowl 19 and the screen 31 is a distributor and mixing blade 32 consisting of a hub portion embracing the shaft 27 and oppositely projecting arms 33, which conform to the contour of the bowl at their lower edges and which project to an elevation short of the under side of the screen 31 at their upper edges. Above the sifter screen 31 the shaft 27 carries a mixing and agitator blade 34 which consists of radial arms disposed directly over the screen so that in operation they practically scrape the surface of the latter.

In the operation of the invention, the ingredients to be mixed and sifted are placed in the bowl 19 and upon the sifting screen 31. The clutch 25 is then engaged by dropping the rod 28 and the shaft 27 is set to rotating and with it the blades 32 and 34. The flour and other dry ingredients on the screen are agitated by blade 34 and an effectual sifting of the materials will take place as the latter pass through the screening material into the lower portion of the bowl 19 and into the path of the moving blades 33, which carry the sifted materials to the mouth of the spout 20 where they are discharged downwardly into the mixing bowl 15.

In the modification illustrated in Fig. 3, the sifting device construction remains the same as that of Figs. 1 and 2, except that instead of being attached to and operated by a food mixing machine, the device is provided with a motor unit 35 having its housing 36 arranged with an extension 37 in which a gear train 38 is connected to the motor 35 and shaft 11 of the socket connection 18. With this construction the sifter is always in readiness for use and need not be detached from its power unit except for cleaning.

Having now described my invention and the manner in which the same operates, what I claim and desire to secure by Letters Patent is:

A power operated sifter assembly, comprising a power unit and a bowl to contain the materials to be sifted, having a discharge spout at the lower portion thereof and an axial depending housing for attachment to said power unit, a fixed partition of screening material disposed laterally of the bowl to provide compartments above and below the partition, a driven shaft bearing in the housing and disposed upright in said bowl and projecting axially of the lower and upper compartments, radial agitator arms carried by the shaft in the upper compartment and adjacent the screen to move the materials over and through the screening into the lower compartment, radial distributor arms forming a wall substantially the height of the space between the bottom of the bowl and the said screen and mounted to turn with the shaft to shift the sifted materials towards and into the discharge spout, a clutch arranged in the housing and associated with the power unit and the shaft to impart power to the latter when engaged.

References Cited in the file of this patent

UNITED STATES PATENTS

| | | |
|---|---|---|
| 340,635 | Stead | Apr. 27, 1886 |
| 509,496 | Stickney | Nov. 28, 1893 |
| 1,428,704 | Peiri | Sept. 12, 1922 |
| 2,074,162 | Bowman | Mar. 16, 1937 |
| 2,672,075 | Fraser | Mar. 16, 1954 |